(12) United States Patent
Bentley

(10) Patent No.: US 11,345,320 B2
(45) Date of Patent: May 31, 2022

(54) MAGNETIC BRAKE ASSIST, TRACTION CONTROL AND FORWARD ASSIST

(71) Applicant: James A. Bentley, Albany, GA (US)

(72) Inventor: James A. Bentley, Albany, GA (US)

(*) Notice: Subject to any disclaimer, the term of this patent is extended or adjusted under 35 U.S.C. 154(b) by 0 days.

(21) Appl. No.: 16/506,420

(22) Filed: Jul. 9, 2019

(65) Prior Publication Data

US 2021/0009090 A1    Jan. 14, 2021

(51) Int. Cl.
| | |
|---|---|
| *B60T 1/02* | (2006.01) |
| *F16D 63/00* | (2006.01) |
| *B60T 1/06* | (2006.01) |
| *B60T 13/74* | (2006.01) |
| *B60K 7/00* | (2006.01) |
| *F16D 121/20* | (2012.01) |

(52) U.S. Cl.
CPC ............. *B60T 1/02* (2013.01); *B60K 7/0007* (2013.01); *B60T 1/06* (2013.01); *B60T 13/748* (2013.01); *F16D 63/002* (2013.01); *B60K 2007/0092* (2013.01); *B60T 2270/20* (2013.01); *B60T 2270/30* (2013.01); *F16D 2121/20* (2013.01)

(58) Field of Classification Search
CPC . B60T 1/02; B60T 1/06; B60T 13/748; B60K 7/0007; B60K 2007/0092; F16D 63/002; F16D 2121/20
See application file for complete search history.

(56) References Cited

U.S. PATENT DOCUMENTS

| | | | | |
|---|---|---|---|---|
| 3,566,165 | A * | 2/1971 | Lohr | B60L 7/22 310/67 R |
| 5,164,623 | A * | 11/1992 | Shkondin | B60L 50/20 310/67 R |
| 5,327,034 | A * | 7/1994 | Couture | H02K 11/048 310/67 R |
| 7,306,065 | B2 * | 12/2007 | Nagaya | B60G 3/20 180/65.51 |
| 8,459,386 | B2 * | 6/2013 | Pickholz | B60L 15/00 180/65.51 |
| 2007/0063595 | A1 * | 3/2007 | Habibi | H02K 29/08 310/67 A |
| 2009/0066173 | A1 * | 3/2009 | Takahashi | F03D 9/25 310/48 |
| 2012/0215389 | A1 * | 8/2012 | Perry | H02K 15/03 701/22 |

* cited by examiner

*Primary Examiner* — Ryan A Reis
(74) *Attorney, Agent, or Firm* — Ingenium Patents LLC; Peter R. Kramer

(57) ABSTRACT

This device is magnetic brake assist, traction control and forward assist. It uses magnets inserted in the vehicles rims and in a stationary hub bolted behind the wheels hub and brake disk; to either slow the rotation of the tire down or speed the rotation up for braking and or for forward assist.

3 Claims, 1 Drawing Sheet

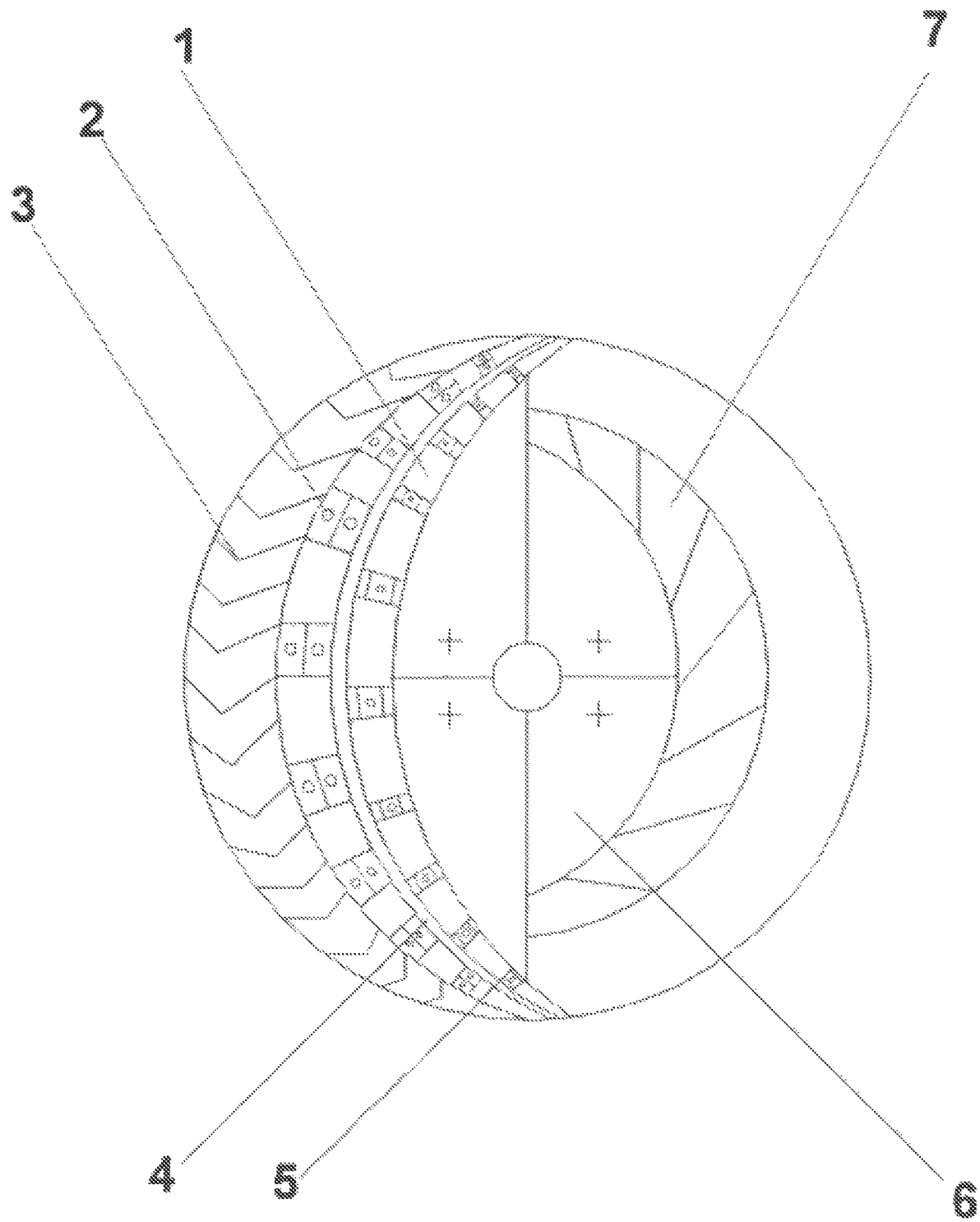

MAGNETIC BRAKE ASSIST, TRACTION CONTROL AND FORWARD ASSIST

FIELD

The present application relates to a Magnetic Brake Assist Hub used to assist in braking and also used for traction control and forward assist.

BACKGROUND

This Magnetic Brake Assist Hub will use electromagnets in conjunction with earth magnets to slow the rotation of the tire.

SUMMARY

The magnetic brake assist Hub will be used to slow the rotation of the inside tires during banking in a curve allowing it to turn the vehicle more efficiently in the curve without having to slow the momentum of the vehicle using the manual brakes.

The Hub will also slow the rotation of the tires incase of a spinout as a way of traction control.

The Hub will also use the magnets to help drive the wheels forward helping with fuel consumption as a forward assist feature.

BRIEF DESCRIPTION OF THE DRAWING

In the following detailed portion of the present description, the teachings of the present application will be explained in more detail with reference to the example embodiments shown in the drawings, in FIG. 1 is an isometric view of the Magnetic Brake Assist Hub. It also shows the tire, the rim, the electromagnets, the earth magnets and the brake disk according to the first embodiment.

DETAILED DESCRIPTION

The following is a detailed description of the Magnetic Brake Assist unit.

FIG. 1 Number 1 is a description of the inner magna hub. It is comprised of a round aluminum hub that is bolted behind the brake disk to the wheel hub. It has a row of electromagnets evenly spaced around the whole circumference of the hub. The electromagnets will be inserted with one side facing up. A switch will be used to charge the direction of the electrical current from one side of the magnet to the other side, thus changing the polarity of the exposed side of the electromagnet to positive to negative during operation.

FIG. 1 Number 2 is a description of an aluminum rim with earth magnets inserted on the inside of the wheel circumference. They will be evenly spaced and set in order with their polarity starting with negative, positive, negative, positive alternating the polarities from negative to positive around the circumference of the wheel. The aluminum rim and tire will act as the outer magna hub. It will slide over the top of the inner magna hub with a clearance of no less than one and a half inches. It will also have a dust and debris ring installed to keep dirt, rocks and foreign objects from getting in between the two hubs and causing the wheel to lock up or damage the magnets. The rim and tire acting as the outer magna hub will be bolted to the lug nuts. The inner magna hub will be bolted behind the brake disk and the wheel hub. It will be stationary and will turn only from side to side as you turn the steering wheel. The rim and the tire acting as the outer magna hub will rotate around the inner magna hub as the wheel moves forward. We will use the electromagnets in the inner magna hub; and adjust their polarity to ether pull the earth magnet in the outer magna hug either towards them or push them away depending on if we are trying to stop the tire or push the tire forward.

Eventually we will power the outer magna hub comprising of the tire and rim by inserting a power in the center of the hub to keep the tire in balance. We will then add electromagnets to the outer magna hub to be able to further manipulate the polarities.

FIG. 1 number 3 the tire.
FIG. 1 number 4 the earth magnet.
FIG. 1 number 5 the electromagnets.
FIG. 1 number 6 the wheel hub and lugs.
FIG. 1 number 7 the brake disk and brake caliper.

The invention claimed is:

1. A device serving as magnetic brake assist, traction control, and forward assist for a vehicle, said device comprising,
   an inner magna hub coupled to a wheel hub of said vehicle, said inner magna hub is a round aluminum hub;
   a plurality of electromagnets disposed on said inner magna hub along a circumference thereof;
   a switch in electrical connection with said plurality of electromagnets, said switch configured to change direction of electric current from one side to other side of said plurality of electromagnets;
   a rim having a plurality of earth magnets secured to an inner surface thereof with alternating polarities, said rim is made of aluminum;
   a tire being operatively disposed on said rim, said rim and said tire defining an outer magna hub,
      wherein said outer magna hub being rotatably disposed around said inner magna hub with a clearance there between, which facilitates rotation of said outer magna hub relative to said inner magna hub, wherein said clearance between said outer magna hub and said inner magna hub is no less than one and a half inch; and
   a ring disposed to cover said clearance between said outer magna hub and said inner magna hub, said ring preventing intrusion of dust and debris into said clearance;
      wherein by adjusting the polarities of said plurality of electromagnets, rotation of said outer magna hub is increased or decreased thereby accelerating or decelerating said vehicle.

2. The device as claimed in claim 1, wherein said plurality of electromagnets being evenly disposed along said circumference of said inner magna hub.

3. The device as claimed in claim 1, wherein said plurality of earth magnets being evenly disposed along said rim.

* * * * *